(12) United States Patent
Styborski et al.

(10) Patent No.: US 11,085,304 B2
(45) Date of Patent: Aug. 10, 2021

(54) VARIABLY SKEWED TRIP STRIPS IN INTERNALLY COOLED COMPONENTS

(71) Applicant: UNITED TECHNOLOGIES CORPORATION, Farmington, CT (US)

(72) Inventors: Jeremy Styborski, East Hartford, CT (US); Alex J. Schneider, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 284 days.

(21) Appl. No.: 16/002,313

(22) Filed: Jun. 7, 2018

(65) Prior Publication Data
US 2019/0376393 A1 Dec. 12, 2019

(51) Int. Cl.
*F01D 5/18* (2006.01)

(52) U.S. Cl.
CPC ...... *F01D 5/187* (2013.01); *F05D 2260/2212* (2013.01)

(58) Field of Classification Search
CPC . F01D 5/085; F01D 5/145; F01D 5/18; F01D 5/187; F01D 25/12; F04D 27/001; F28F 13/12; F05D 2240/127; F05D 2260/83; F05D 2260/2212
USPC ...................................................... 416/96 R
See application file for complete search history.

(56) References Cited

U.S. PATENT DOCUMENTS

| | | | |
|---|---|---|---|
| 6,641,362 B1 | 11/2003 | Anding et al. | |
| 7,866,947 B2 | 1/2011 | Pietraszkiewicz et al. | |
| 7,955,053 B1 | 6/2011 | Liang | |
| 2015/0118034 A1* | 4/2015 | Lee | F01D 9/02 415/175 |
| 2015/0322798 A1 | 11/2015 | Bauer et al. | |
| 2015/0377029 A1* | 12/2015 | Blake | F01D 9/065 416/232 |
| 2016/0032730 A1 | 2/2016 | Thomen et al. | |
| 2017/0096900 A1* | 4/2017 | Bunker | F01D 5/145 |

(Continued)

FOREIGN PATENT DOCUMENTS

| | | |
|---|---|---|
| EP | 1944469 | 7/2008 |
| EP | 3056673 | 8/2016 |

(Continued)

OTHER PUBLICATIONS

Phil Ligrani, "Heat Transfer Augmentation Technologies for Internal Cooling of Turbine Components of Gas Turbine Engines", 2013, Hindawi Publishing Corporation, International Journal of Rotating Machinery, vol. 2013 (Year: 2013).*

(Continued)

*Primary Examiner* — Brian P Wolcott
*Assistant Examiner* — Justin A Pruitt
(74) *Attorney, Agent, or Firm* — Snell & Wilmer L.L.P.

(57) ABSTRACT

A component for a gas turbine engine may comprise a cooling channel. A first trip strip may extend from a wall of the cooling channel. A leg of the first trip strip and a first plane orthogonal to a direction of airflow through the cooling channel may form a first angle. A second trip strip may be downstream from the first trip strip and extending from the wall of the cooling channel. A leg of the second trip strip and a second plane orthogonal to the direction of airflow through the cooling channel may form a second angle different from the first angle.

23 Claims, 4 Drawing Sheets

(56) References Cited

U.S. PATENT DOCUMENTS

2017/0226885 A1  8/2017  Clum et al.
2019/0040748 A1* 2/2019  Clark ..................... F01D 5/187

FOREIGN PATENT DOCUMENTS

| EP | 3438412 | 2/2019 |
| WO | 2014112968 | 7/2014 |
| WO | 2014175937 | 10/2014 |

OTHER PUBLICATIONS

Rongguang Jia, "Heat Transfer Enhancement in Square Ducts With V-Shaped Ribs of Various Angles.", 2002, ASME, Proceedings of the ASME Turbo Expo 2002: Power for Land, Sea, and Air. vol. 3: Turbo Expo 2002, Parts A and B, pp. 469-476. (Year: 2002).*
European Patent Office, European Partial Search Report dated Feb. 19, 2020 in Application No. 19179001.3.
European Patent Office, European Office Action dated Mar. 22, 2021 in Application No. 19179001.3.

* cited by examiner

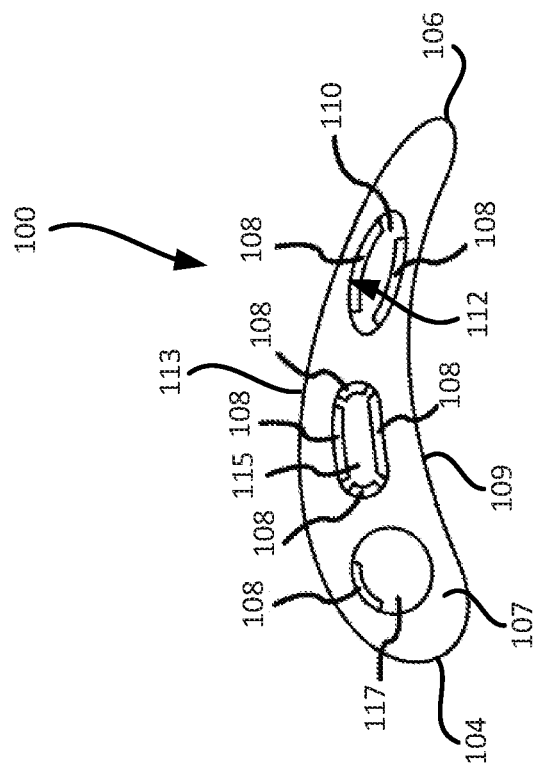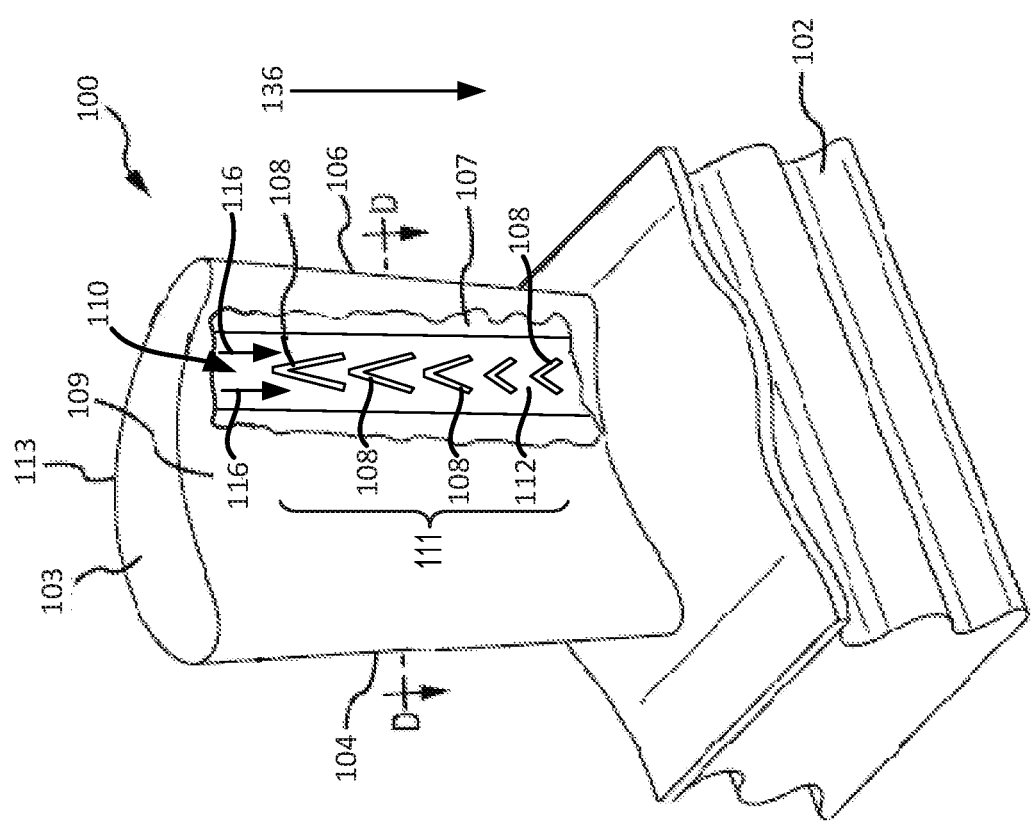

VARIABLY SKEWED TRIP STRIPS IN INTERNALLY COOLED COMPONENTS

FIELD OF INVENTION

The present disclosure relates to gas turbine engines, and, more specifically, to an internally cooled component with variably skewed trip strips.

BACKGROUND

A gas turbine engine typically includes a fan section, a compressor section, a combustor section, and a turbine section. The fan section may drive air along a bypass flowpath while the compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Turbine airfoils and outer air seals may operate in an environment where the gas temperatures often exceed the thermal capacity of materials in the engine. These parts may incorporate internal cooling channels that utilize cooling air to absorb heat from the part's walls and limit material temperatures.

SUMMARY

A component for a gas turbine engine is disclosed herein. In accordance with various embodiments, the component may comprise an internal cooling channel disposed within the component. A first trip strip may extend from a first wall of the internal cooling channel. The first trip strip may comprise a first leg extending in a downstream direction toward a second wall of the internal cooling channel. The first trip strip may be located a first distance from an inlet of the internal cooling channel. The first leg of the first trip strip and a first plane orthogonal to a direction of airflow through the internal cooling channel may form a first angle. A second trip strip may extend from the first wall of the internal cooling channel. The second trip strip may comprise a first leg extending in the downstream direction toward the second wall of the internal cooling channel. The second trip strip may be located a second distance from the inlet. The second distance may be greater than the first distance. The first leg of the second trip strip and a second plane orthogonal to the direction of airflow through the internal cooling channel may form a second angle different from the first angle.

In various embodiments, the second angle may be less than the first angle. In various embodiments, the first trip strip and the second trip strip may be chevron-shaped trip strips. An angle formed by the first leg of the first trip strip and a second leg of the first trip strip may be less than an angle formed by the first leg of the second trip strip and a second leg of the second trip strip.

In various embodiments, a third trip strip may be adjacent to the first leg of the first trip strip. A fourth trip strip may be adjacent to the first leg of the second trip strip. The third trip strip may be approximately parallel to the first leg of the first trip strip. The fourth trip strip may be approximately parallel to the first leg of the second trip strip.

In various embodiments, the first trip strip may comprise a W-shaped trip strip. In various embodiments, a third trip strip may be downstream from the second trip strip and extending from the first wall of the internal cooling channel. The third trip strip may comprise a first leg. The first leg of the third trip strip and a third plane orthogonal to the direction of airflow through the internal cooling channel may form a third angle. The third angle may be approximately equal to the second angle.

A gas turbine engine is also disclosed herein. In accordance with various embodiments, the gas turbine engine may comprise a compressor and an internally cooled component aft of the compressor. The internally cooled component may comprise a cooling channel, a first trip strip extending from a first wall of the cooling channel, and a second trip strip downstream from the first trip strip and extending from the first wall of the cooling channel. A first leg of the first trip strip may extend in a downstream direction toward a second wall of the cooling channel. The first leg of the first trip strip and a first plane orthogonal to a direction of airflow through the cooling channel may form a first angle. A first leg of the second trip strip may extend in the downstream direction toward the second wall of the cooling channel. The first leg of the second trip strip and a second plane orthogonal to the direction of airflow through the cooling channel may form a second angle different from the first angle.

In various embodiments, the first trip strip may comprise a first chevron-shaped trip strip. In various embodiments, the internally cooled component may comprise an airfoil.

In various embodiments, the internally cooled component may further comprise a third trip strip adjacent to the first leg of the first trip strip, and a fourth trip strip adjacent to the first leg of the second trip strip. The third trip strip may be approximately parallel to the first leg of the first trip strip. The fourth trip strip may be approximately parallel to the first leg of the second trip strip.

In various embodiments, the internally cooled component may further comprise a third trip strip downstream from the second trip strip and extending from the first wall of the cooling channel. The third trip strip may comprise a first leg. The first leg of the third trip strip and a third plane parallel to the first plane and the second plane may form a third angle. The third angle may be approximately equal to the second angle.

In various embodiments, the internally cooled component may further comprise a third trip strip extending from a third wall of the cooling channel, and a fourth trip strip downstream from the third trip strip and extending from the third wall of the cooling channel. The third wall of the cooling channel may be oriented toward the first wall of the cooling channel.

In various embodiments, an angle formed by the first leg of the first trip strip and a second leg of the first trip strip may be less than an angle formed by the first leg of the second trip strip and a second leg of the second trip strip.

An airfoil is also disclosed herein. In accordance with various embodiments, the airfoil may comprise an internal cooling channel. A turbulator may extend from a wall of the internal cooling channel. A first portion of the turbulator and a first plane orthogonal to a direction of airflow through the internal cooling channel may form a first angle. A second portion of the turbulator, downstream from the first portion, and a second plane orthogonal to the direction of airflow through the internal cooling channel may form a second angle different from the first angle.

In various embodiments, the first portion of the turbulator may comprise a first chevron-shaped trip strip. The second portion of the turbulator may comprise a second chevron-shaped trip strip.

In various embodiments, the turbulator may further comprise a third portion downstream from the second portion. The third portion and a third plane orthogonal to the direction of airflow through the internal cooling channel may form a third angle approximately equal to the second angle.

In various embodiments, the turbulator may comprise a rifling trip strip formed helically along the internal cooling channel.

In various embodiments, a component for a gas turbine engine may comprise an internal cooling channel disposed within the component. A first trip strip may extend from a first wall of the internal cooling channel. The first trip strip may comprise a first leg and a second leg joined at a first apex. The first leg of the first trip strip and the second leg of the first trip strip may form a first angle. A second trip strip may be located downstream of the first trip strip and extending from the first wall of the internal cooling channel. The second trip strip may comprise a first leg and a second leg joined at a second apex. The first leg of the second trip strip and the second leg of the second trip strip may form a second angle. The second angle may be greater than the first angle.

In various embodiments, a third trip strip may be downstream from the second trip strip and extending from the first wall of the internal cooling channel. The third trip strip may comprise a first leg and a second leg joined at a third apex. The first leg of the third trip strip and the second leg of the third trip strip may form a third angle. The third angle may be approximately equal to the second angle.

In various embodiments, the component may comprise an airfoil. In various embodiments, the first trip strip may comprise a W-shaped trip strip.

In various embodiments, a third trip strip may be adjacent to the first leg of the first trip strip. The third trip strip may be approximately parallel to the first leg of the first trip strip. A fourth trip strip may be adjacent to the first leg of the second trip strip. The fourth trip strip may be approximately parallel to the first leg of the second trip strip.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 2A illustrates a perspective view of an airfoil having a cooling channel with variably skewed trip strips, in accordance with various embodiments;

FIG. 2B illustrates a cross-sectional view of the airfoil of FIG. 2A take along the line D-D in FIG. 2A, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction outward, or generally, away from a reference component. As used herein, "proximate" refers to a direction inward, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
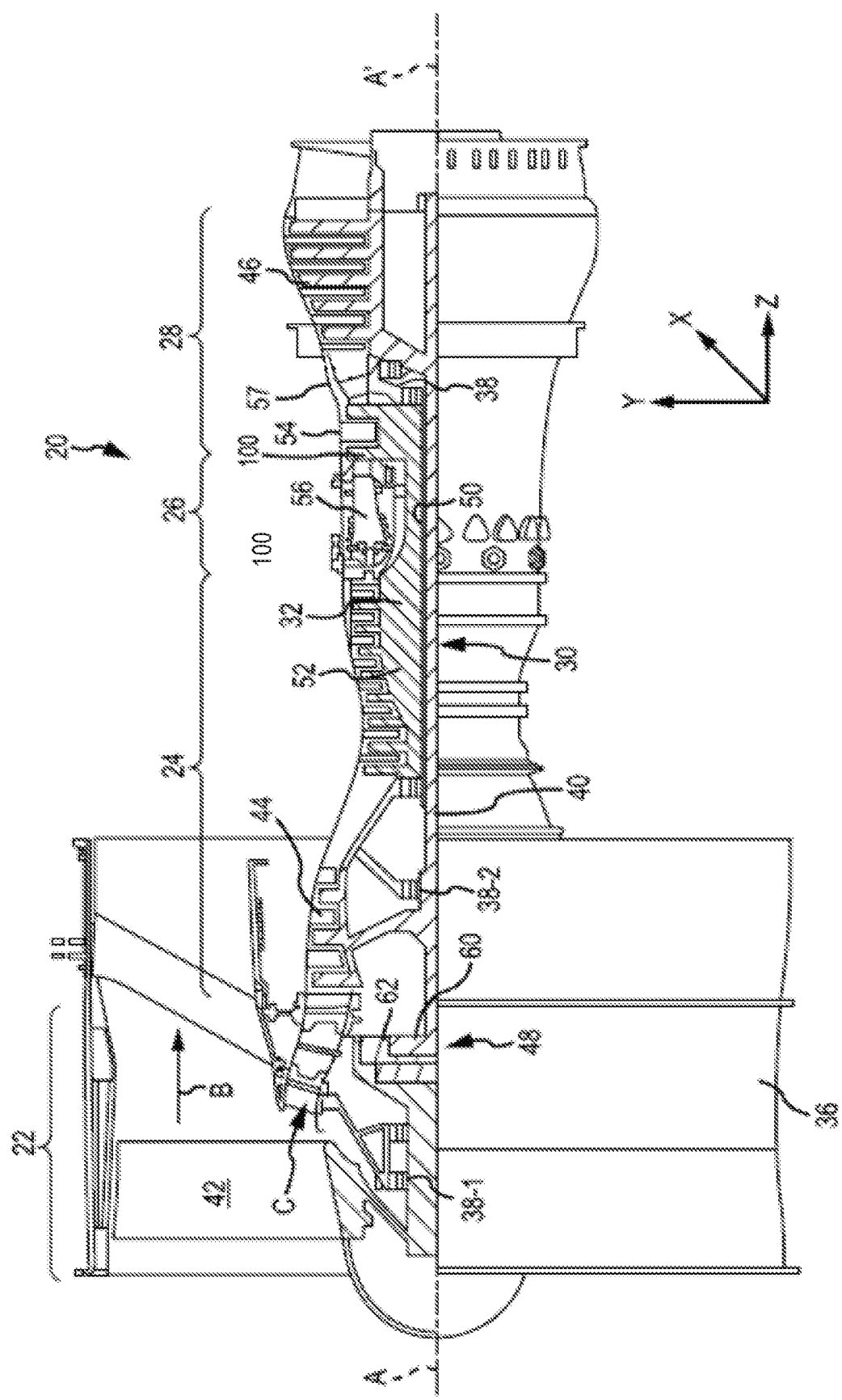
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. In operation, fan section 22 can drive fluid (e.g., air) along a bypass flow-path B while compressor section 24 can drive fluid along a core flow-path C for compression and communication into combustor section 26 and then expansion through turbine section 28. Although depicted as a turbofan gas turbine engine 20 herein, it should be understood that the concepts described herein are not limited to use with turbofans as the teachings may be applied to other types of turbine engines including multi-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 100 of high-pressure turbine 54 may rotate about the engine central longitudinal axis A-A'.

A combustor 56 may be located between high-pressure compressor 52 and high-pressure turbine 54. A mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Gas turbine engine 20 may include one or more internally cooled component. For example, airfoils 100 in high pressure turbine 54 may comprise internally cooled engine components. Trip strips may be located in internal cavities of internally cooled engine components, as detailed further below. Internally cooled engine components may be discussed in the present disclosure in terms of airfoils. However, the present disclosure applies to any internally cooled engine component (e.g., blade outer air seals, airfoil platforms, combustor liners, blades, vanes, or any other internally cooled component in a gas turbine engine).

FIG. 2A illustrates an airfoil 100 having variably skewed trip strips 108 located in an internal cavity 110 (also referred to herein as cooling channel 110) of airfoil 100, in accordance with various embodiments. Airfoil 100 may include a hub 102 for attaching airfoil 100 to a disk of a rotor system. Airfoil 100 comprises a radially outer edge or tip 103 located radially outward from hub 102. Airfoil 100 has a leading edge 104 and a trailing edge 106 opposite leading edge 104. Airfoil 100 may include a generally concave pressure side 109 and a generally convex suction side 113 joined together at the respective leading edge 104 and trailing edge 106.

A portion of pressure side 109 is cutaway to illustrate trip strips 108 formed on a wall 112 of cooling channel 110. A material 107 of airfoil 100 may define internal channels, such as cooling channel 110, of airfoil 100. Trip strips 108 may protrude and extend from wall 112 of cooling channel 110. A fluid such as coolant 116 (e.g., air) may be directed through cooling channel 110 generally in a direction (illustrated by arrow 136) from tip 103 towards hub 102 (i.e., in a radially inward direction) when airfoil 100 is installed in a turbine. Trip strips 108 formed along the wall(s) of cooling channel 110 may "trip" the flow of coolant 116, thereby increasing local flow velocity and turbulence, which in turn, may increase heat transfer capacity. In this regard, trip strips 108 form a turbulator 111 within cooling channel 110. While coolant 116 may be illustrated as flowing through cooling channel 110 in a radially inward direction, the present disclosure applies to coolant flowing in any direction (e.g., radially outward, forward, aft, etc.). Stated differently, the present disclosure applies to cooling channels oriented in any direction. For example, in various embodiments, airfoil 100 may include a radially oriented cooling channel with an inlet proximate to hub 102 so that coolant flows in a generally radially outward direction. In various embodiments, airfoil 100 may include an axially oriented cooling channel with an inlet located proximate leading edge 104 so that coolant 116 flows in a direction generally from leading edge 104 toward trailing edge 106. In various embodiments, airfoil 100 may include an axially oriented cooling channel with an inlet located proximate trailing edge 106 so that coolant 116 flows in a direction generally from trailing edge 106 toward leading edge 104.

As described in further detail below, an angle of the legs of trip strips 108 may vary through cooling channel 110 such that the legs of the trip strips 108 closer to an inlet of cooling channel 110 (i.e., closer to tip 103) may be oriented at an angle, relative to the direction of airflow through cooling channel 110, that is different from the legs of the trip strips 108 distal to the inlet of cooling channel 110 (i.e., closer to hub 102).

Airfoil 100 may contain multiple cooling channels similar to cooling channel 110, as further illustrated in FIG. 2B. In various embodiments, the internal cooling channels are interconnected. In various embodiments, trip strips 108 may be formed on multiple walls of the internal cooling channel.

With further reference to FIG. 2B, a cross sectional view along line D-D in FIG. 2A is shown, in accordance with various embodiments. Cooling channel 110 includes trip strips 108 on two walls. In this regard, a first set of trip strips 108 may extend from wall 112 and a second set of trip strips 108 may extend from a second wall, which is oriented generally towards wall 112. A cooling channel 115 has trip strips 108 disposed about four walls of cooling channel 115. A cooling channel 117 includes trip strips 108 on one wall. Trip strips 108 may be disposed on any wall of a cooling channel. Similarly, any number of trip strips may be deployed as a turbulator for airflow through a cooling channel and providing increased surface area for heat transfer. In that regard, trip strips 108 tend to increase heat transfer between coolant (i.e., air from the compressor section) and the walls of internal cooling channels. Thus, cooling efficiency may be improved.

In various embodiments, trip strips 108 may be made using an additive manufacturing technique such as direct metal laser sintering, selective laser sintering, selective laser melting, electron-beam melting, or electron-beam freeform fabrication. Casting may also be used to form trip strips 108 in an internally cooled component. Airfoil 100 (as well as other internally cooled components) may be made from an austenitic nickel-chromium-based alloy such as that sold under the trademark Inconel® which is available from Special Metals Corporation of New Hartford, N.Y., USA, or other materials capable of withstanding exhaust temperatures.

Figure 3C:
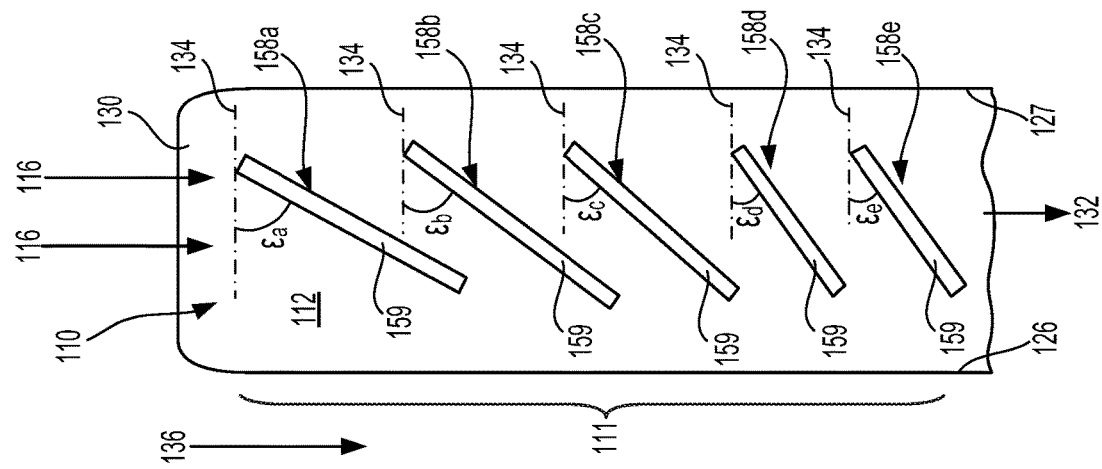
FIG. 3C illustrates a wall of a cooling channel having variably skewed trip strips, in accordance with various embodiments.
Figure 3B:
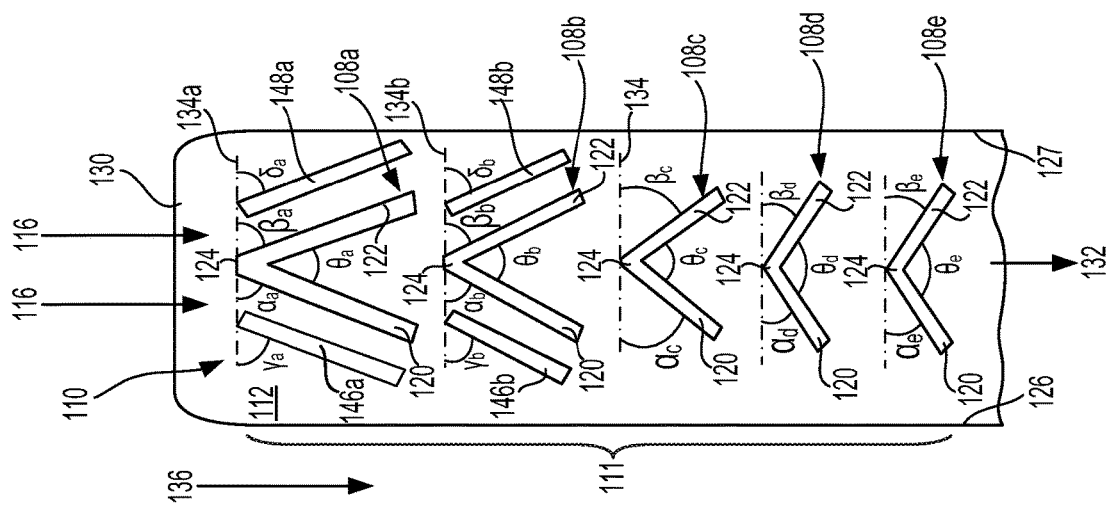
FIG. 3B illustrates a wall of a cooling channel having a combination of variably skewed chevron-shaped and linear trip strips, in accordance with various embodiments.
Figure 3A:
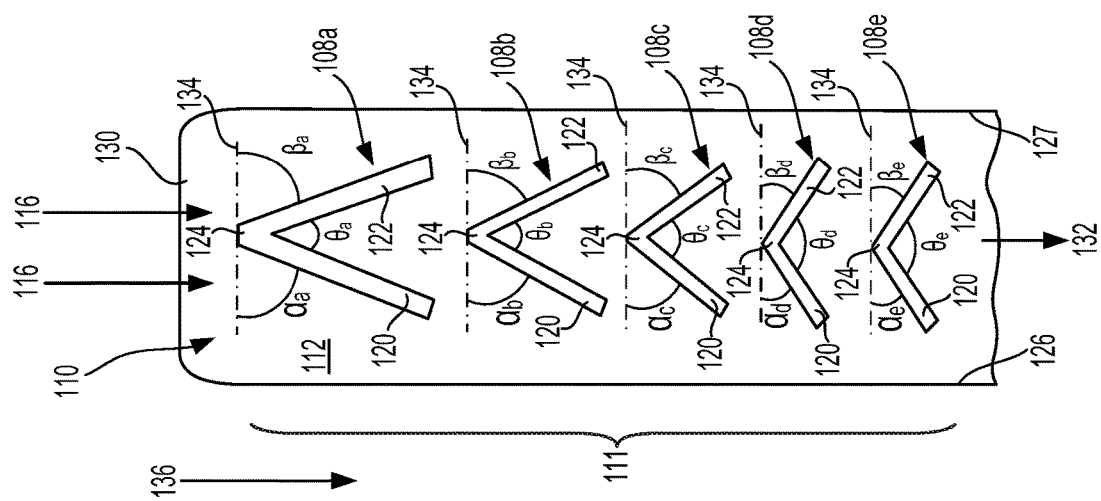
FIG. 3A illustrates a wall of a cooling channel having variably skewed chevron-shaped trip strips, in accordance with various embodiments.

FIGS. 3A-3F illustrate trip strip configurations that may be formed on one or more walls of an internally cooled component, in accordance various embodiments. With reference to FIG. 3A, wall 112 of cooling channel 110 having chevron-shaped trip strips 108a, 108b, 108c, 108d, 108e is illustrated, in accordance with various embodiments. Chevron-shaped trip strips 108a, 108b, 108c, 108d, 108e may each include a first leg 120 and a second leg 122 joined at an apex 124. The apex 124 of each chevron-shaped trip strip 108a, 108b, 108c, 108d, 108e is oriented toward an inlet 130 of cooling channel 110. First leg 120 may extend from apex 124 toward a wall 126 of cooling channeling 110, in a forward downstream direction. Second leg 122 may extend from apex 124 toward a wall 127 of cooling channeling 110, in an aftward downstream direction. Wall 126 may be oriented generally toward wall 127.

Coolant 116 flows generally from inlet 130 toward an outlet 132 of cooling channel 110 (i.e., in the direction of arrow 136), such that chevron-shaped trip strip 108b is downstream from chevron-shaped trip strip 108a, chevron-shaped trip strip 108c is downstream from chevron-shaped trip strip 108b, chevron-shaped trip strip 108d is downstream from chevron-shaped trip strip 108c, etc. Chevron-shaped trip strips 108a, 108b, 108c, 108d, 108e may form turbulator 111. Stated differently, a first portion of turbulator 111 may include a first trip strip (e.g., chevron-shaped trip strip 108a) and a second portion of turbulator 111 may include a second trip strip downstream of the first trip strip (e.g. chevron-shaped trip strip 108b, 108c, 108d, or 108e).

An angle theta ($\theta$) may be formed by first leg 120 and second leg 122. An angle alpha ($\alpha$) may be formed by first leg 120 and an imaginary plane 134. Plane 134 is generally orthogonal to a direction (illustrated by arrow 136) of airflow (e.g., coolant 116) through cooling channel 110. Stated differently, plane 134 is generally orthogonal to a direction extending from inlet 130 toward outlet 132 of cooling channel 110. Stated yet another way, plane 134 is generally orthogonal to wall 112 of cooling channel 110. As used in the present context only, "generally orthogonal" means between 85° and 95°. An angle beta ($\beta$) may be formed by second leg 122 and plane 134.

In various embodiments, chevron-shaped trip strips 108a, 108b, 108c, 108d, 108e may be variably skewed such that angles $\alpha$ and $\beta$ vary relative to the trip strip's distance from inlet 130. For example, angle $\alpha_a$ of chevron-shaped trip strip 108a may be greater than angle $\alpha_b$ of chevron-shaped trip strip 108b. Angle $\beta_a$ of chevron-shaped trip strip 108a may be greater than angle $\beta_b$ of chevron-shaped trip strip 108b. Angles $\alpha_b$ and $\beta_b$ of chevron-shaped trip strip 108b may be greater, respectively, than angles $\alpha_c$ and $\beta_c$ of chevron-shaped trip strip 108c. Angles $\alpha_c$ and $\beta_c$ of chevron-shaped trip strip 108c may be greater, respectively, than angles $\alpha_d$ and $\beta_d$ of chevron-shaped trip strip 108d. In various embodiments, angles $\alpha_d$ and $\beta_d$ of chevron-shaped trip strip 108d may be approximately equal, respectively, to angles $\alpha_e$ and $\beta_e$ of chevron-shaped trip strip 108e, and any chevron-shaped trips strips downstream of chevron-shaped trip strip 108e may comprise angles $\alpha$ and $\beta$ that are approximately equal, respectively, to angles $\alpha_e$ and $\beta_e$ of chevron-shaped trip strip 108e. As used in the present context only, "approximately equal" means ±2°. In this regard, chevron-shaped trip strips 108d and 108e may be configured having angles $\alpha$ and $\beta$ that generate an optimal or a particular amount of swirl based on a particular Reynolds number of coolant 116. In various embodiments, angles $\alpha_e$ and $\beta_e$ of chevron-shaped trip strip 108e may each be between 20° and 60°. In various embodiments, angles $\alpha_e$ and $\beta_e$ of chevron-shaped trip strip 108e may each be between 30° and 50°. In various embodiments, angles $\alpha_e$ and $\beta_e$ of chevron-shaped trip strip 108e may each be approximately 45°. As used in the present context only, "approximately" means ±2°.

While turbulator 111 may be illustrated as achieving optimal or full swirl by the fourth and fifth trip strips (e.g., by chevron-shaped trip strips 108d and 108e), the present disclosure applies to turbulators wherein an optimal or a full swirl is achieved downstream of the fourth and fifth trip strips, for example, at the seventh trip strip downstream from inlet 130, or at the tenth trip strip, or the twentieth trip strip. In this regard, angles $\alpha$ and $\beta$ may continue to change at and beyond the fourth and fifth trip strips. For example, in various embodiments, angles $\alpha_d$ and $\beta_d$ of chevron-shaped trip strip 108d may be greater, respectively, than angles $\alpha_e$ and $\beta_e$ of chevron-shaped trip strip 108e, and angles $\alpha_e$ and $\beta_e$ of chevron-shaped trip strip 108e may be greater, respectively, than the angles $\alpha$ and $\beta$ of one or more chevron-shaped trip strips downstream from chevron-shaped trip strip 108e.

Utilizing chevron-shaped trip strips with greater angles $\alpha$ and $\beta$ proximate to inlet 130 of cooling channel 110 tends to catalyze a swirling flow of coolant 116. In this regard, locating chevron-shaped trip strips with the greatest angles $\alpha$ and $\beta$ proximate inlet 130 and decreasing angles $\alpha$ and $\beta$ in subsequent downstream chevron-shaped trip strips tends to decrease the distance required to develop a swirling flow of coolant 116.

In various embodiments, chevron-shaped trip strips 108a, 108b, 108c, 108d, 108e may be variably skewed such that angle $\theta$ varies relative to the trip strip's distance from inlet 130. For example, angle $\theta_a$ of chevron-shaped trip strip 108a may be less than angle $\theta_b$ of chevron-shaped trip strip 108b. Angle $\theta_b$ of chevron-shaped trip strip 108b may be less than angle $\theta_c$ of chevron-shaped trip strip 108c. Angle $\theta_c$ of chevron-shaped trip strip 108c may be less than angle $\theta_d$ of chevron-shaped trip strip 108d. In various embodiments, angle $\theta_d$ of chevron-shaped trip strip 108d may be approximately equal to angle $\theta_e$ of chevron-shaped trip strip 108e, and any chevron-shaped trips strips downstream of chevron-shaped trip strip 108e may comprise an angle $\theta$ that is approximately equal to angles $\theta_d$ and $\theta_e$ of chevron-shaped trip strips 108d and 108e. As used in the present context only, "approximately equal" means ±2°. In this regard, chevron-shaped trip strips 108d and 108e may be configured having an angle $\theta$ that generates an optimal or a particular amount of swirl based on a particular Reynolds number of coolant 116. In various embodiments, angle $\theta_e$ of chevron-shaped trip strip 108e may be between 60° and 140°. In various embodiments, angle $\theta_e$ of chevron-shaped trip strip 108e may be between 80° and 120°. In various embodiments, angle $\theta_e$ of chevron-shaped trip strip 108e may be approximately 90°. As used in the present context only, "approximately" means ±2°.

FIG. 3B illustrates a wall of a cooling channel with turbulator 111 including additional trip strips adjacent to chevron-shaped trip strips, in accordance with various embodiments. In various embodiments, one or more trip strip(s) may be formed adjacent to the chevron-shaped trip strips located proximate inlet 130 of cooling channel 110. For example, chevron-shaped trip strip 108a may be supplemented with a trip strip 146a adjacent to first leg 120, and with a trip strip 148a adjacent to second leg 122. Chevron-shaped trip strip 108b may be supplemented with a trip strip 146b adjacent to first leg 120, and with a trip strip 148b adjacent to second leg 122. In various embodiments, trip strips 146a, 146b, 148a, and 148b may be linear, or rectangular-shaped, trip strips.

Trip strip 146a and plane 134a form an angle gamma ($\gamma_a$). Trip strip 148a and plane 134a form an angle delta ($\delta_a$). Trip strip 146b and plane 134b form an angle $\gamma_b$. Trip strip 148b and plane 134b form an angle $\delta_b$. In various embodiments, angle $\gamma_a$ may be greater than angle $\gamma_b$, and angle $\delta_a$ may be greater than angle $\delta_b$. In various embodiments, angle $\gamma_a$ may be equal to angle $\alpha_a$ of chevron-shaped trip strip 108a, and angle $\delta_a$ may be equal to angle $\beta_a$. Stated differently, trip strip 146a may be approximately parallel to first leg 120 of chevron-shaped trip strip 108a, and trip strip 148a may be approximately parallel to second leg 122 of chevron-shaped trip strip 108a. In various embodiments, trip strips 146b and 148b may be approximately parallel, respectively, to first leg 120 and second leg 122 of chevron-shaped trip strip 108b. As used in the present context only, "approximately equal" means ±2°. In various embodiments, angles $\gamma_a$ and $\delta_a$ may differ, respectively, from angles $\alpha_a$ and $\beta_a$ of chevron-shaped trip strip 108a (i.e., angles $\gamma_a$ and $\delta_a$ may be greater than or less than angles $\alpha_a$ and $\beta_a$) and angles $\gamma_b$ and $\delta_b$ may differ, respectively, from angles $\alpha_b$ and $\beta_b$ of chevron-shaped trip strip 108b.

With reference to FIG. 3C, a wall of cooling channel 110 with turbulator 111 having variably skewed trip strips 158a, 158b, 158c, 158d, 158e is shown, in accordance with various embodiments. Trip strips 158a, 158b, 158c, 158d, 158e each comprise a single leg 159. In various embodiments, trip strips 158a, 158b, 158c, 158d, 158e may be linear, or rectangular-shaped, trip strips. Each leg 159 is oriented at an angle epsilon ($\varepsilon$) relative to plane 134. In other words, each leg 159 and its respective plane 134 form angle E. Trip strips 158a, 158b, 158c, 158d, 158e may be variably skewed such that angle E varies relative to the trip strip's distance from inlet 130. For example, angle $\varepsilon_a$ of trip strip 158a may be greater than angle $\varepsilon_b$ of trip strip 158b. Angle $\varepsilon_b$ of trip strip 158b may be greater than angle $\varepsilon_c$ of trip strip 158c. Angle $\varepsilon_c$ of trip strip 158c may be greater than angle $\varepsilon_d$ of trip strip 158d. In various embodiments, angle $\varepsilon_d$ of trip strip 158d may be approximately equal to angle $\varepsilon_e$ of trip strip 158e, and any trips strips downstream of trip strip 158e may comprise an angle $\varepsilon$ that is approximately equal to angle $\varepsilon_e$ of trip strips 158d and 158e. As used in the present context only, "approximately equal" means ±2°. In this regard, trip strips 158d and 158e may be oriented at an angle $\varepsilon$ that generates an optimal or a particular amount of swirl based on a particular Reynolds number of coolant 116.

Figure 3F:
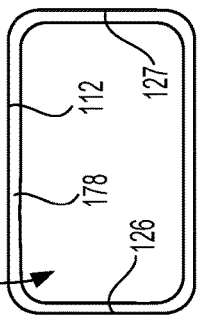
FIG. 3F illustrates a cross-sectional view of the cooling channel of FIG. 3E take along the line F-F in FIG. 3E, in accordance with various embodiments.
Figure 3E:
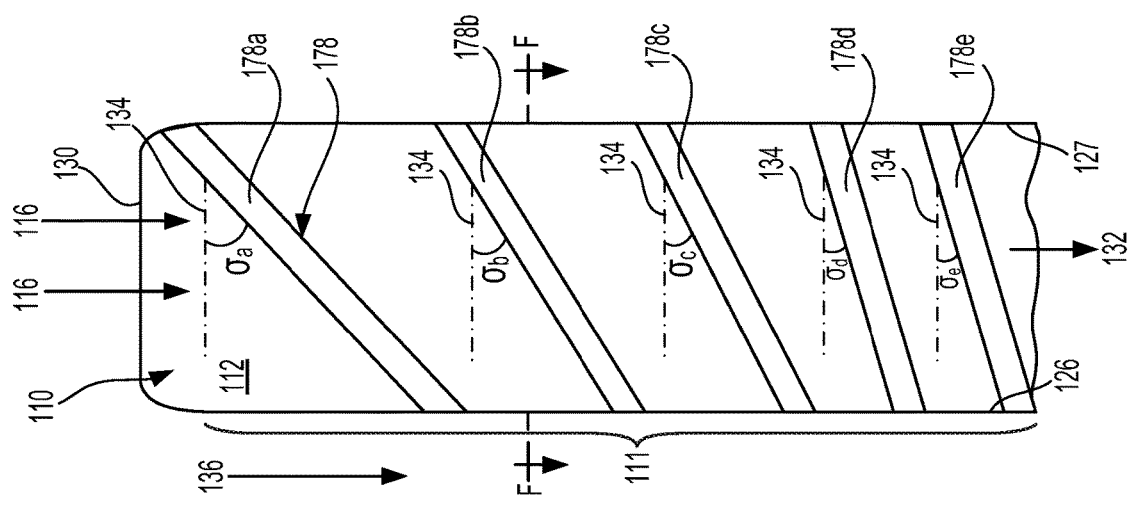
FIG. 3E illustrates a wall of a cooling channel having a variably skewed trip strip in a riffling geometry, in accordance with various embodiments.
Figure 3D:
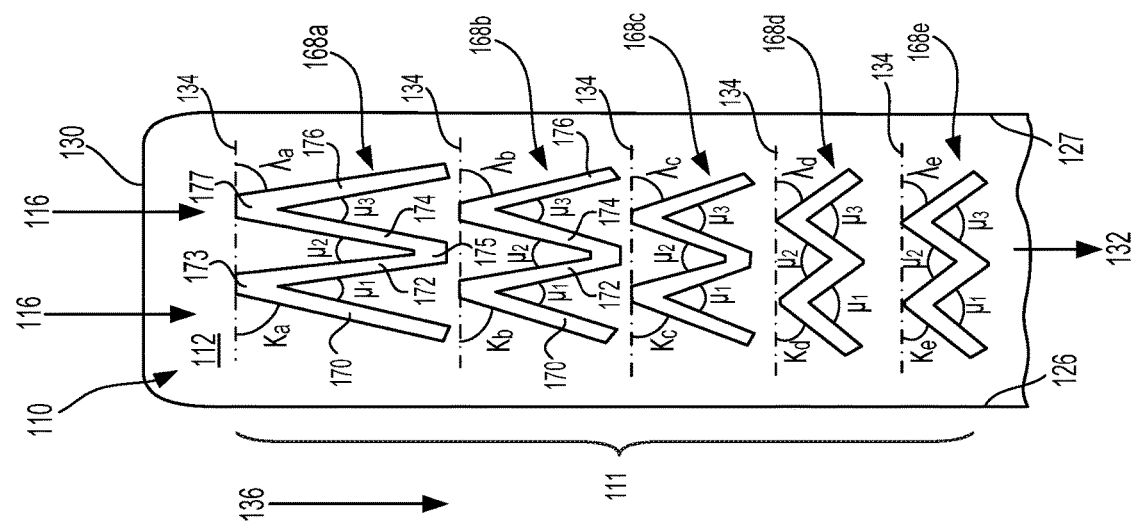
FIG. 3D illustrates a wall of a cooling channel having variably skewed W-shaped trip strips, in accordance with various embodiments.

With reference to FIG. 3D, a wall of cooling channel 110 with turbulator 111 having variably skewed W-shaped trip strips 168a, 168b, 168c, 168d, 168e is shown, in accordance with various embodiments. W-shaped trip strips 168a, 168b, 168c, 168d, 168e may each include a leg 170 and a leg 172 joined at an apex 173. Apex 173 may be oriented toward inlet 130 of cooling channel 110. Leg 170 may extend from apex 173 in a forward downstream direction toward wall 126 of cooling channeling 110. Leg 172 may extend from apex 173 in an aftward downstream direction toward wall 127 of cooling channeling 110. W-shaped trip strips 168a, 168b, 168c, 168d, 168e may each further include a leg 174 joined to leg 172 at an apex 175. Apex 175 may be oriented toward outlet 132 of cooling channel 110. Leg 172 may extend from apex 175 in a forward upstream direction toward wall 126 of cooling channeling 110. Leg 174 may extend from apex 175 in an aftward upstream direction toward wall 127 of cooling channeling 110. W-shaped trip strips 168a, 168b, 168c, 168d, 168e may each further include a leg 176 joined to leg 174 at an apex 177. Apex 177 may be oriented toward inlet 130 of cooling channel 110. Leg 174 may extend from apex 177 in a forward downstream direction toward wall 126 of cooling channeling 110. Leg 176 may extend from apex 177 in an aftward downstream direction toward wall 127 of cooling channeling 110.

Leg 170 of each W-shaped trip strip 168a, 168b, 168c, 168d, 168e may be oriented at an angle kappa ($\kappa$) relative to plane 134. Leg 176 of each W-shaped trip strip 168a, 168b, 168c, 168d, 168e may be oriented at an angle lambda ($\lambda$) relative to plane 134. Legs 170 and 172 of each W-shaped trip strip 168a, 168b, 168c, 168d, 168e may form an angle mu$_1$ ($\mu_1$). Legs 172 and 174 of each W-shaped trip strip 168a, 168b, 168c, 168d, 168e may form an angle $\mu_2$. Legs 174 and 176 of each W-shaped trip strip 168a, 168b, 168c, 168d, 168e may form an angle $\mu_3$.

W-shaped trip strips 168a, 168b, 168c, 168d, 168e may be variably skewed such that angles $\kappa$ and $\lambda$ vary relative to the trip strip's distance from inlet 130. In this regard, angles $\kappa$ and $\lambda$ may decrease in subsequent downstream W-shaped trip strips. For example, angles $\kappa_a$ and $\lambda_a$ of W-shaped trip strip 168a may be greater, respectively, than angles $\kappa_b$ and $\lambda_b$ of W-shaped trip strip 168b. Angles $\kappa_b$ and $\lambda_b$ of W-shaped trip strip 168b may be greater, respectively, than angles $\kappa_c$ and $\lambda_c$ of W-shaped trip strip 168c. Angles $\kappa_c$ and $\lambda_c$ of W-shaped trip strip 168c may be greater, respectively, than angles $\kappa_d$ and $\lambda_d$ of W-shaped trip strip 168d. In various embodiments, angles $\kappa_d$ and $\lambda_d$ of W-shaped trip strip 168d may be approximately equal to angles $\kappa_e$ and $\lambda_e$ of W-shaped trip strip 168e, and any trips strips downstream of W-shaped trip strip 168e may comprise angles $\kappa$ and $\lambda$ that are approximately equal angles $\kappa_e$ and $\lambda_e$ of W-shaped trip strip 168e. As used in the present context only, "approximately equal" means ±2°. In this regard, W-shaped trip strips 168d and 168e may be oriented at angles $\kappa$ and $\lambda_e$ that generate an optimal or a particular amount of swirl based on a particular Reynolds number of coolant 116.

In various embodiments, angles $\mu_1$, $\mu_2$, and/or $\mu_3$ may vary relative to the W-shaped trip strip's distance from inlet 130. In this regard, angles $\mu_1$, $\mu_2$, and/or $\mu_3$ may increase in subsequent downstream W-shaped trip strips. For example, angle $\mu_1$, $\mu_2$, and/or $\mu_3$ of W-shaped trip strip 168a may be greater, respectively, than angle $\mu_1$, $\mu_2$, and/or $\mu_3$ of W-shaped trip strip 168b. Angle $\mu_1$, $\mu_2$, and/or $\mu_3$ of W-shaped trip strip 168b may be greater, respectively, than angle $\mu_1$, $\mu_2$, and/or $\mu_3$ of W-shaped trip strip 168c. Angle $\mu_1$, $\mu_2$, and/or $\mu_3$ of W-shaped trip strip 168c may be greater, respectively, than angle $\mu_1$, $\mu_2$, and/or $\mu_3$ of W-shaped trip strip 168d, and angle $\mu_1$, $\mu_2$, and/or $\mu_3$ of W-shaped trip strip 168d may be approximately equal, respectively, to angle $\mu_1$, $\mu_2$, and/or $\mu_3$ of W-shaped trip strip 168e. Any trips strips downstream of W-shaped trip strip 168e may comprise angles $\mu_1$, $\mu_2$, and/or $\mu_3$ that are approximately equal angles $\mu_1$, $\mu_2$, and/or $\mu_3$ of W-shaped trip strip 168e. As used in the present context only, "approximately equal" means ±2°. In this regard, W-shaped trip strips 168d and 168e may be oriented at angles $\mu_1$, $\mu_2$, and $\mu_3$ that generate an optimal or a particular amount of swirl based on a particular Reynolds number of coolant 116.

With reference to FIG. 3E, a wall of cooling channel 110 with turbulator 111 having a rifling trip strip 178 is shown, in accordance with various embodiments. FIG. 3F shows a cross sectional view of cooling channel 110 along line F-F in FIG. 3E. With combined reference to FIGS. 3E and 3F. Rifling trip strip 178 may be formed helically along the walls of cooling channel 110. In various embodiments, rifling trip strip 178 may include a plurality of variably skewed portions, for example, portions 178a, 178b, 178c, 178d, 178e. Portions 178a, 178b, 178c, 178d, 178e may each be oriented at an angle sigma ($\sigma$) relative to plane 134. Angle $\sigma$ may vary relative to the distance from inlet 130. In this regard, angle $\sigma$ may decrease in subsequent downstream portions of rifling trip strip 178. For example, angle $\sigma_a$ of portion 178a may be greater than angle $\sigma_b$ of portion 178b. Angle $\sigma_b$ of portion 178b may be greater than angle $\sigma_c$ of portion 178c. Angle $\sigma_c$ of portion 178c may be greater than angle $\sigma_d$ of portion 178d. In various embodiments, angle $\sigma_d$ of portion 178d may be approximately equal to angle $\sigma_e$ of portion 178e, and any remaining downstream portions of rifling trip strip 178 may remain oriented at an angle $\sigma$ that is approximately equal to the angle $\sigma_e$ formed by portion 178e and plane 134. As used in the present context only, "approximately equal" means ±2°. In this regard, portions 178d and 178e may be oriented at an angle $\sigma$ that generates an optimal or a particular amount of swirl based on a particular Reynolds number of coolant 116.

Utilizing trip strips having legs oriented at greater angles, relative to a plane (e.g., plane 134) orthogonal to the direction of airflow through the cooling channel, near the inlet of the cooling channel tends to catalyze a swirling of coolant flowing through the channel. In this regard, locating trip strips with legs oriented at the greatest angles, relative to plane 134, proximate to the inlet and decreasing the angles of the legs, relative to plane 134, in subsequent downstream trip strips tends to decrease the distance required to develop a swirling flow of coolant. Variably skewed trip strips (i.e., trip strips having legs oriented at varying angles relative to the direction of airflow through the channel) may reduce pressure and flow velocity losses associated with tripping the coolant flow at the inlet of the cooling channel. The increased angles of the legs proximate the inlet may cause a gradual turning of the coolant flow entering the cooling channel. This gradual turning, may reduce turbulent losses and low velocity separation regions downstream of the trip strips. Turning the coolant flow near the inlet may also allow the swirling flow structure to develop sooner, rather than delaying the onset of swirls by turbulating the flow. A greater presence of swirling flow within a cooling channel may lead to greater mixing and therefore greater heat exchange capacity.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A component for a gas turbine engine, comprising:
    an internal cooling channel disposed within the component;
    a first trip strip extending from a first wall of the internal cooling channel, the first trip strip comprising a first leg and a second leg joined at a first apex, the first apex being oriented toward an inlet of the internal cooling channel, wherein the first leg of the first trip strip extends in a downstream direction toward a second wall of the internal cooling channel and the second leg of the first trip strip extends in the downstream direction toward a third wall of the internal cooling channel, and wherein a first surface of the first leg of the first trip strip and a first surface the second leg of the first trip strip form a first angle, and wherein the first surface of the first leg of the first trip strip and the first surface of the second leg of the first trip strip each extend from the first wall of the internal cooling channel, the first surface of the first leg of the first trip strip being oriented generally toward the first surface of the second leg of the first trip strip;
    a second trip strip downstream from the first trip strip and extending from the first wall of the internal cooling channel, the second trip strip comprising a first leg and a second leg joined at a second apex, the second apex being oriented toward the inlet of the internal cooling channel, wherein the first leg of the second trip strip extends in the downstream direction toward the second wall of the internal cooling channel and the second leg of the second trip strip extends in the downstream direction toward the third wall of the internal cooling channel, and wherein a first surface of the first leg of the second trip strip and a first surface of the second leg of the second trip strip form a second angle, the second angle being greater than the first angle, and wherein the first surface of the first leg of the second trip strip and the first surface of the second leg of the second trip strip each extend from the first wall of the internal cooling channel, the first surface of the first leg of the second trip strip being oriented generally toward the first surface of the second leg of the second trip strip; and a plurality of third trip strips downstream from the second trip strip and extending from the first wall of the internal cooling channel, wherein each third trip strip of the plurality of third trip strips comprises a first leg and a second leg joined at a third apex, the third apex being oriented toward the inlet of the internal cooling channel, and wherein the first leg of each third trip strip of the plurality of third trip strips extends in the downstream direction toward the second wall of the internal cooling channel and the second leg of each third trip strip of the plurality of third trip strips extends in the downstream direction toward the third wall of the internal cooling channel, and wherein a first surface of the first leg of each third trip strip and a first surface of the second leg of each third trip strip form a third angle, the third angle being greater than the second angle, and wherein the first surface of the first leg of each third trip strip and the first surface of the second leg of each third trip strip each extend from the first wall of the internal cooling channel, the first surface of the first leg of each third trip strip being oriented generally toward the first surface of the second leg of each third trip strip.

2. The component of claim 1, wherein:

a first leg angle formed between a second surface of the first leg of the first trip strip and a first plane generally orthogonal to the second wall of the internal cooling channel is equal to a second leg angle formed between a second surface of the second leg of the first trip strip and the first plane, and wherein the second surface of the first leg of the first trip strip extends from the first wall of the internal cooling channel and is oriented generally toward the second wall the internal cooling channel, and wherein the second surface of the second leg of the first trip strip extends from the first wall of the internal cooling channel and is oriented generally toward the third wall of the internal cooling channel; and wherein a third leg angle formed between a second surface of the first leg of the second trip strip and a second plane parallel to the first plane is equal to a fourth leg angle formed between a second surface of the second leg of the second trip strip and the second plane, and wherein the second surface of the first leg of the second trip strip extends from the first wall of the internal cooling channel and is oriented generally toward the second wall the internal cooling channel, and wherein the second surface of the second leg of the second trip strip extends from the first wall of the internal cooling channel and is oriented generally toward the third wall of the internal cooling channel.

3. The component of claim 2, wherein the first leg angle and the second leg angle are greater than the third leg angle and the fourth leg angle.

4. The component of claim 1, wherein the first trip strip, the second trip strip, each third trip strip of the plurality of third trip strips are chevron-shaped trip strips.

5. The component of claim 4, further comprising:

a fourth trip strip adjacent to the first leg of the first trip strip, the fourth trip strip being located between the first leg of the first trip strip and the second wall of the internal cooling channel; and a fifth trip strip adjacent to the second leg of the first trip strip, the fifth trip strip being located between the second leg of the first trip strip and the third wall of the internal cooling channel.

6. The component of claim 5, wherein the fourth trip strip is approximately parallel to the first leg of the first trip strip, and wherein the fifth trip strip is approximately parallel to the second leg of the first trip strip.

7. The component of claim 1, wherein the first trip strip comprises a W-shaped trip strip.

8. A gas turbine engine, comprising:

a compressor; and an internally cooled component aft of the compressor, the internally cooled component comprising:

a cooling channel;

a first trip strip extending from a first wall of the cooling channel, the first trip strip comprising a first leg and a second leg joined at a first apex, the first apex being oriented toward an inlet of the cooling channel, wherein the first leg of the first trip strip extends in a downstream direction toward a second wall of the cooling channel and the second leg of the first trip strip extends in the downstream direction toward a third wall of the cooling channel, and wherein a first surface of the first leg of the first trip strip and a first surface of the second leg of the first trip strip form a first angle, and wherein the first surface of the first leg of the first trip strip and the first surface of the second leg of the first trip strip each extend from the first wall of the cooling channel, the first surface of the first leg of the first trip strip being oriented generally toward the first surface of the second leg of the first trip strip;

a second trip strip downstream from the first trip strip and extending from the first wall of the cooling channel, the second trip strip comprising a first leg and a second leg joined at a second apex, the second apex being oriented toward the inlet of the cooling channel, wherein the first leg of the second trip strip extends in the downstream direction toward the second wall of the cooling channel and the second leg of the second trip strip extends in the downstream direction toward the third wall of the cooling channel, and wherein a first surface of the first leg of the second trip strip and a first surface of the second leg of the second trip strip form a second angle, the second angle being greater than the first angle, and wherein the first surface of the first leg of the second trip strip and the first surface of the second leg of the second trip strip each extend from the first wall of the cooling channel, the first surface of the first leg of the second trip strip being oriented generally toward the first surface of the second leg of the second trip strip; and a plurality of third trip strips downstream from the second trip strip and extending from the first wall of the cooling channel, wherein each third trip strip of the plurality of third trip strips comprises a first leg and a second leg joined at a third apex, the third apex being oriented toward the inlet of the cooling channel, and wherein the first leg of each third trip strip of the plurality of third trip strips extends in the downstream direction toward the second wall of the cooling channel and the second leg of each third trip strip of the plurality of third trip strips extends in the downstream direction toward the third wall of the cooling channel, and wherein a first surface of the first leg of each third trip strip of the plurality of third trip strips and a first surface of the second leg of each third trip strip of the plurality of third trip strips form a third angle, and wherein the third angle is greater than the second angle, and wherein the first surface of the first leg of each third trip strip and the first surface of the second leg of each third trip strip each extend from the first wall of the cooling channel, the first surface of the first leg of each third trip strip being oriented generally toward the first surface of the second leg of each third trip strip.

9. The gas turbine engine of claim 8, wherein the first trip strip comprises a chevron-shaped trip strip.

10. The gas turbine engine of claim 8, wherein the internally cooled component further comprises:
a fourth trip strip adjacent to the first leg of the first trip strip, the fourth trip strip being located between the first leg of the first trip strip and the second wall of the cooling channel; and
a fifth trip strip adjacent to the second leg of the first trip strip, the fifth trip strip being located between the second leg of the first trip strip and the third wall of the cooling channel.

11. The gas turbine engine of claim 10, wherein the fourth trip strip is approximately parallel to the first leg of the first trip strip, and wherein the fifth trip strip is approximately parallel to the second leg of the first trip strip.

12. The gas turbine engine of claim 8, wherein the internally cooled component further comprises:
a fourth trip strip extending from a fourth wall of the cooling channel, wherein the fourth wall of the cooling channel is oriented toward the first wall of the cooling channel; and
a fifth trip strip downstream from the fourth trip strip and extending from the fourth wall of the cooling channel.

13. The gas turbine engine of claim 8, wherein the internally cooled component comprises an airfoil.

14. The gas turbine engine of claim 8, wherein:
a first leg angle formed between a second surface of the first leg of the first trip strip and a first plane generally orthogonal to the second wall of the cooling channel is equal to a second leg angle formed between a second surface of the second leg of the first trip strip and the first plane, and wherein the second surface of the first leg of the first trip strip extends from the first wall of the cooling channel and is oriented generally toward the second wall the cooling channel, and wherein the second surface of the second leg of the first trip strip extends from the first wall of the cooling channel and is oriented generally toward the third wall of the cooling channel; and wherein
a third leg angle formed between a second surface of the first leg of the second trip strip and a second plane parallel to the first plane is equal to a fourth leg angle formed between a second surface of the second leg of the second trip strip and the second plane, and wherein the second surface of the first leg of the second trip strip extends from the first wall of the cooling channel and is oriented generally toward the second wall the cooling channel, and wherein the second surface of the second leg of the second trip strip extends from the first wall of the cooling channel and is oriented generally toward the third wall of the cooling channel.

15. The gas turbine engine of claim 14, wherein the first leg angle is greater than the third leg angle.

16. An airfoil, comprising:
an internal cooling channel; and
a turbulator formed in the internal cooling channel, wherein the turbulator comprises:
a first trip strip extending from a first wall of the internal cooling channel, the first trip strip comprising a first leg and a second leg joined at a first apex, the first apex being oriented toward an inlet of the internal cooling channel, wherein the first leg of the first trip strip extends in a downstream direction toward a second wall of the internal cooling channel and the second leg of the first trip strip extends in the downstream direction toward a third wall of the internal cooling channel, and wherein a first surface of the first leg of the first trip strip and a first surface of the second leg of the first trip strip form a first angle, and wherein the first surface of the first leg of the first trip strip and the first surface of the second leg of the first trip strip each extend from the first wall of the internal cooling channel, the first surface of the first leg of the first trip strip being oriented generally toward the first surface of the second leg of the first trip strip;
a second trip strip downstream from the first trip strip and extending from the first wall of the internal cooling channel, the second trip strip comprising a first leg and a second leg joined at a second apex, the second apex being oriented toward the inlet of the internal cooling channel, wherein the first leg of the second trip strip extends in the downstream direction toward the second wall of the internal cooling channel and the second leg of the second trip strip extends in the downstream direction toward the third wall of the internal cooling channel, and wherein a first surface of the first leg of the second trip strip and a first surface of the second leg of the second trip strip form a second angle, the second angle being greater than the first angle, and wherein the first surface of the first leg of the second trip strip and the first surface of the second leg of the second trip strip each extend from the first wall of the internal cooling channel, the first surface of the first leg of the second trip strip being oriented generally toward the first surface of the second leg of the second trip strip;
a plurality of third trip strips downstream from the second trip strip and extending from the first wall of the internal cooling channel, wherein each third trip strip of the plurality of third trip strips comprises a first leg and a second leg joined at a third apex, the third apex being oriented toward the inlet of the internal cooling channel, and wherein the first leg of each third trip strip of the plurality of third trip strips extends in the downstream direction toward the second wall of the internal cooling channel and the second leg of each third trip strip of the plurality of third trip strips extends in the downstream direction toward the third wall of the internal cooling channel, and wherein a first surface of the first leg of each third trip strip and a first surface of the second leg of each third trip strip form a third angle, and wherein the third angle is greater than the second angle, and wherein the first surface of the first leg of each third trip strip and the first surface of the second leg of each third trip strip each extend from the first wall of the internal cooling channel, the first surface of the first leg of each third trip strip being oriented generally toward the first surface of the second leg of each third trip strip.

17. The airfoil of claim 16, wherein the first trip strip comprises a first chevron-shaped trip strip, and wherein the second trip strip comprises a second chevron-shaped trip strip.

18. The airfoil of claim 16, wherein:
a first leg angle formed between a second surface of the first leg of the first trip strip and a first plane generally orthogonal to the second wall of the internal cooling channel is equal to a second leg angle formed between a second surface of the second leg of the first trip strip and the first plane, and wherein the second surface of the first leg of the first trip strip extends from the first wall of the internal cooling channel and is oriented generally toward the second wall the internal cooling channel, and wherein the second surface of the second leg of the first trip strip extends from the first wall of the internal cooling channel and is oriented generally toward the third wall of the internal cooling channel; and wherein
a third leg angle formed between a second surface of the first leg of the second trip strip and a second plane parallel to the first plane is equal to a fourth leg angle formed between a second surface of the second leg of the second trip strip and the second plane, and wherein the second surface of the first leg of the second trip strip extends from the first wall of the internal cooling channel and is oriented generally toward the second wall the internal cooling channel, and wherein the second surface of the second leg of the second trip strip extends from the first wall of the internal cooling channel and is oriented generally toward the third wall of the internal cooling channel.

19. The airfoil of claim 18, wherein the first leg angle is greater than the third leg angle.

20. A component for a gas turbine engine, comprising:
an internal cooling channel disposed within the component;
a first trip strip extending from a first wall of the internal cooling channel, the first trip strip comprising a first leg and a second leg joined at a first apex, wherein a first surface of the first leg of the first trip strip and a first surface of the second leg of the first trip strip form a first angle, and wherein the first surface of the first leg of the first trip strip and the first surface of the second leg of the first trip strip each extend from the first wall of the internal cooling channel, the first surface of the first leg of the first trip strip being oriented generally toward the first surface of the second leg of the first trip strip;
a second trip strip located downstream of the first trip strip and extending from the first wall of the internal cooling channel, the second trip strip comprising a first leg and a second leg joined at a second apex, wherein a first surface of the first leg of the second trip strip and a first surface of the second leg of the second trip strip form a second angle, and wherein the second angle is greater than the first angle, and wherein the first surface of the first leg of the second trip strip and the first surface of the second leg of the second trip strip each extend from the first wall of the internal cooling channel, the first surface of the first leg of the second trip strip being oriented generally toward the first surface of the second leg of the second trip strip; and
a plurality of third trip strips located downstream of the second trip strip and extending from the first wall of the internal cooling channel, wherein each trip strip of the plurality of third trip strips comprises a first leg and a second leg joined at a third apex, and wherein a first surface of the first leg of each third trip strip and a first surface of the second leg of each third trip strip form a third angle, the third angle being greater than the second angle, and wherein the first surface of the first leg of each third trip strip and the first surface of the second leg of each third trip strip each extend from the first wall of the internal cooling channel, the first surface of the first leg of each third trip strip being oriented generally toward the first surface of the second leg of each third trip strip.

21. The component of claim 20, wherein the component comprises an airfoil.

22. The component of claim 20, wherein the first trip strip comprises a W-shaped trip strip.

23. The component of claim 20, further comprising:
a fourth trip strip adjacent to the first leg of the first trip strip, wherein the fourth trip strip is approximately parallel to the first leg of the first trip strip; and
a fifth trip strip adjacent to the first leg of the second trip strip, wherein the fifth trip strip is approximately parallel to the first leg of the second trip strip.

* * * * *